Feb. 23, 1932.　　　C. W. HATKE　　　1,846,594
MAGAZINE FOR MOVING PICTURE REELS AND THE LIKE
Filed Nov. 9, 1925　　2 Sheets-Sheet 1
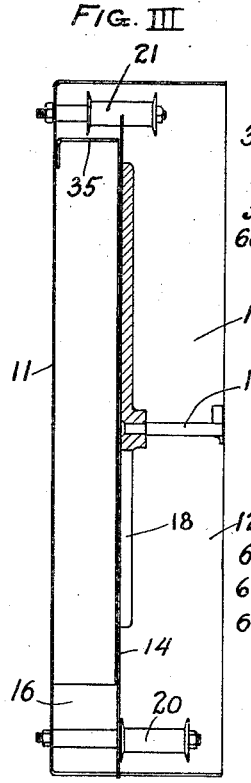
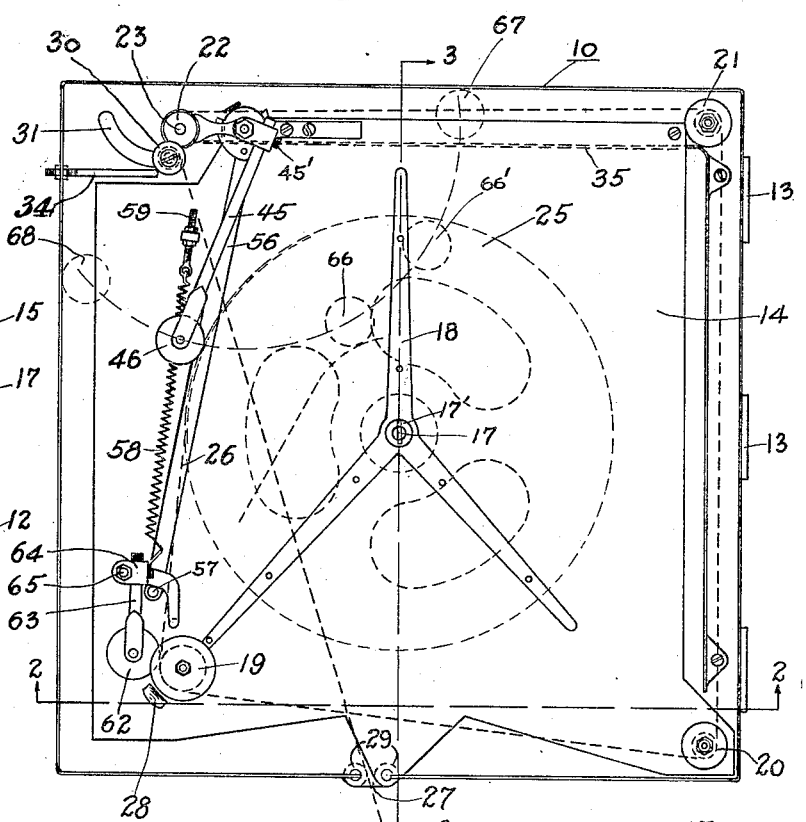
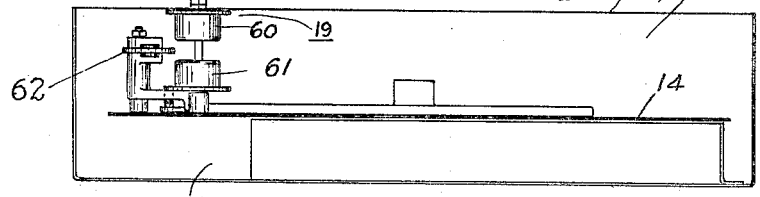
Charles W. Hatke.
INVENTOR.
BY
Searly Whitehead
ATTORNEY.

Feb. 23, 1932.　　　　C. W. HATKE　　　　1,846,594
MAGAZINE FOR MOVING PICTURE REELS AND THE LIKE
Filed Nov. 9, 1925　　　2 Sheets-Sheet 2
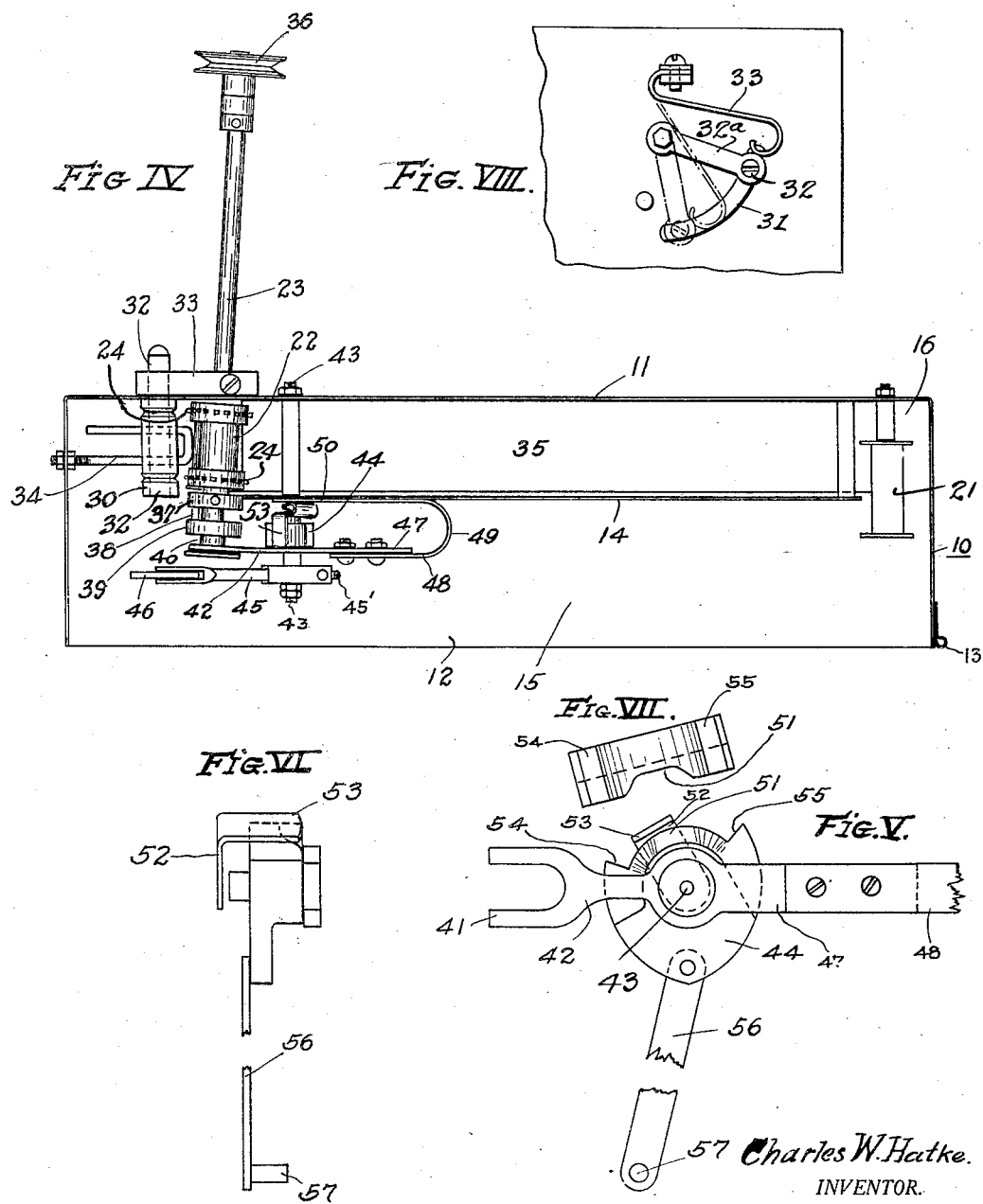
Charles W. Hatke.
INVENTOR.
BY
Carls Whitehead
ATTORNEY.

Patented Feb. 23, 1932

1,846,594

UNITED STATES PATENT OFFICE

CHARLES W. HATKE, OF WINDSOR, COLORADO, ASSIGNOR OF ONE-HALF TO E. M. COSNER, OF DENVER, COLORADO

MAGAZINE FOR MOVING-PICTURE REELS AND THE LIKE

Application filed November 9, 1925. Serial No. 67,917.

This invention relates to the feed magazine for motion picture projector apparatus, and the primary object of the invention is to provide mechanism whereby the operator of the projector may replace a new reel in the magazine and connect the film to the end of the old one without stopping the projector and thereby obtain a continuous showing of a motion picture by the use of one projector only.

In general this magazine for constant projection of motion picture films comprises a casing provided with a partition on one side of which is mounted a reel of motion picture film which is to be fed to the projector, and on the other side of the partition, within the casing, a space is provided wherein a surplus of film may be stored when the film is approaching the end of the reel within the casing. The magazine is provided with a series of guide rolls for guiding the film from one chamber to the other, and mechanism whereby as the end of the film strip is approached the same is withdrawn from the reel faster than required by the projector,— that is, after the diameter of the film on the reel has decreased to a predetermined size. A follower is provided which responds to the change in the diameter of the film on the reel, and which, upon that diameter decreasing to said pre-determined amount, sets into operation mechanism for more rapid withdrawing of the film from the reel. The device further operates to stop the operation of said driving mechanism, when the film is entirely withdrawn from the reel and to signal the operator of the projector so that he may replace the empty reel with a new one, and connect the ends of the films for a continuous operation of the projector from one reel of film to the next.

Further objects and details of the invention will appear from the following description taken in conjunction with the accompanying drawings, forming a part of this specification, and disclosing an embodiment of the invention which is preferred because of its compactness.

Referring to the accompanying drawings, Fig. I is a side elevation of the magazine with the front cover removed showing the general arrangement of the parts in accordance with the present invention.

Fig. II is a cross sectional view taken on line 2—2 of Fig. I, looking upwardly and showing certain parts of the mechanism within the casing, other parts being omitted in order to avoid confusion.

Fig. III is a vertical sectional view taken on line 3—3 of Fig. I through the reel supporting axis looking to the right.

Fig. IV is a plan view of the mechanism within the upper portion of the magazine.

Fig. V is an enlarged elevation detail view of clutch operating mechanism.

Fig. VI is an end elevation view of the parts shown in Fig. V, and

Fig. VII is a plan view of a cam in the clutch operating mechanism shown in Fig. V.

Figure VIII is a detail view looking in the direction of the arrow in Figure IV.

Referring to the drawings, the magazine is generally designated by the reference numeral 10, and comprises a rectangular casing having a back 11, and an open front 12 which may be closed by a suitable cover or door (not shown), supported by hinge members 13, shown on the right hand side of the casing. Within the casing is a partition member 14 suitably supported from the back of the casing, and dividing the casing into a front compartment 15 for receiving a reel of film to be projected and a rear compartment 16 for receiving a surplus supply of film as will hereinafter be set forth.

As shown in Figs. I and III a reel supporting spindle 17 projecting from a web 18 is secured on the front side of the partition 14. Adjacent to the lower left hand corner of the partition a guide roller 19 is pivotally mounted, and a second guide roller 20 is pivotally mounted adjacent to the lower right hand corner of the partition 14. A third guide roller 21 is mounted on the back 11 of the casing and in a position so that its face extends equally on each side of the partition, adjacent to the upper right hand corner thereof. A fourth roller 22 is mounted in the rear portion of the casing on a shaft 23 which shaft is adapted to drive the roller and draw the film by means of sprocket teeth 24 thereon, as will hereinafter be described.

In Fig. I a film reel 25 is indicated by broken lines in position on the spindle 17 and may be held thereon by any suitable locking key 17', and a strip of film 26 also indicated by broken lines, extends from the reel passing over rollers 19, 20, 21 and 22, and through the orifice 27. Each of the guide rollers may be provided with spring clasps, such as indicated at 28 for the roller 19, to prevent the film from being displaced from the roller, and the orifice 27 is preferably provided with guide rollers 29 on each side of the film. The roller 22 is preferably provided with a guide roller 30 pivotally mounted on a spindle 32, extending through an arcuate slot 31 in a well known manner, so that the film will be securely held in contact with the roller 22 and a positive drive by the sprockets 24 will be established. Spindle 32 is carried by arm 32a and is normally held against roller 22 by spring 33, which are of usual construction in the motion picture projector art, and therefore shown in conventional form only. The casing is further provided with a member 34 extending inwardly adjacent to roller 30 for holding the film in proximity to sprocket roller 22 whenever roller 30 is not in engagement therewith. A guard member 35 encloses the upper portion and right side of the compartment so as to prevent accumulated film within said compartment from coming into contact with the roller 21, the film as it passes from the reel, and other parts of the mechanism, and for keeping the surplus film therein in the proper position for feeding through orifice 27.

Referring to Fig. IV it will be noted that the shaft 23 upon which roller 22 is mounted is arranged at a slight angle from the perpendicular and extends through the casing, whereby the film passing from the guide roller 21 will be drawn evenly when the roller 22 is brought into operative engagement with the shaft 23 by the action of the clutch. During the normal operation of the projector roller 22 is loose on the shaft 23 so that it is free to rotate at the speed at which the film is passed through the projector. Shaft 23, however, is provided with a pulley 36 at its outer end for operating the shaft which is adapted to be revolved at considerably greater speed at all times than that at which the sprocket roller 22 revolves when the film is passing direct therefrom to the projector. On the inner end of shaft 23 suitable clutch mechanism is mounted, which mechanism is adapted to engage roller 22 and secure it to and cause it to revolve with the shaft. The clutch mechanism shown comprises a collar 37 fixed to the shaft beyond the inner end of the roller 22 and provided with an eccentric aperture through which a pin 38 on longitudinally moving collar member 39 may project into a depression in the end of roller 22 so as to lock roller 22 on to the shaft 23 by means of collar 37. Collar 39 is provided with an annular groove 40 into which the bifurcated end 41 of clutch operating lever 42 extends.

The operating mechanism for the clutch lever 42 includes a supporting shaft 43 arranged in adjacent and substantially parallel relationship to the shaft 23 and has mounted thereon a cam member 44 and an operating lever 45 for turning the cam. The free end of the operating lever 45 is provided with a rotary disk 46 which normally engages the periphery of the roll of the film on the reel 25 and is adapted to follow the same as the diameter thereof decreases, and thereby turn the cam 44 for operating the clutch on shaft 23.

In the various figures the full lines disclose the mechanism with the parts in the position which they assume with a full reel of film on spindle 17. In this position the clutch is held open and the clutch operating lever 42 is in its outermost position. This lever is apertured and extends loosely around the shaft 43 and is mounted by means of its end 47 on a spring 48. This spring is bent at 49 and has its end 50 suitably secured to the partition member 14. The tension of the spring is sufficient to normally urge the clutch operating lever 42 into driving relationship with the roller 22 as above described, but with the parts in the position shown, the cam 44 operates to hold the clutch in its disengaged position. Cam 44 is provided with a depression 51 in its upper portion which, when turned downwardly to the left, will allow the clutch operating lever 42 to be moved inwardly by the spring, and thereby effect the engagement of clutch members with the roller 22. The clutch operating mechanism also includes an angle member 52 pivoted behind the cam 44 and having a lateral projection 53 which extends outwardly between projections 54 and 55 on the cam 44 so as to be operated thereby. In one position of the parts the outer end of the lateral projection 53 engages the clutch operating lever 42 as will hereinafter be set forth in connection with the operation of the members.

At the lower portion of cam 44 is pivoted a link 56 which extends in a downward direction and is provided at its lower end with a lateral offset 57. Adjacent to the lower end of the link 56 is connected a spring 58 and this spring is secured to the partition 14 as by means of a tension adjusting screw 59. The link 56, spring 58 and other members are so arranged that the spring will tend to hold the operating lever 45 in an inoperative position with the rotary disc 46 in engagement with the side wall of the casing as indicated at 68, or so as to urge it against the periphery of the film in the opposite direction.

As shown in Figs. I and II the guide roller 19 is formed of two separate sections, 60 and 61, whereby a disc 62 may be allowed to pass between them. Disc 62 is mounted in the end of a rod 63 which in turn is secured to a lever 64 pivotally connected with the partition 14 at 65. Lever 64 extends over the lateral projection 57 of link 56, whereby spring 58 is adapted to urge the disc 62 toward the guide roller 19 after the diameter of film on reel 25 has decreased to the point at which the clutch is thrown into engagement.

In operation of the apparatus the reel of film to be projected is mounted on spindle 17 and the film is placed in the position, threaded over the various rollers, as hereinbefore set forth, and the operating parts are in the full line position in Fig. 1,—that is with the rotary disc 46 in engagement with the periphery of the roll of film. As the film is unreeled the disc 46 is gradually permitted to move toward the right until it is in the position indicated at 66, when it immediately passes from the film to the position 66'. In this position cam 44 is turned so as to permit the clutch operating lever 42 to be pressed by the spring 48 into the depression 51 and thereby move the clutch collar 39 inwardly so as to project the pin 38 into the depression in the end of roller 22. Since shaft 23 is rotated at a considerable speed, the film is drawn from the reel 25 faster than it is drawn into the projector and the surplus film is accumulated in the chamber 16 to supply the projector while a new reel is being placed on spindle 17. As soon as the film is entirely withdrawn from the reel, and its end passes from the roller 19 the disc 62 passes between the parts 60 and 61 thereof and thus permits the spring to operate on link 56 and swing the operating lever 45 with its disc 46 to the position shown at 67. As the disc 46 engages the top of the casing, it audibly signals the operator of the projector indicating that the reel 25 is empty, and at the same time the cam 44 is turned so as to withdraw clutch operating lever 42 to disengage the connection between shaft 23 and roller 22. When the lever 45 is turned to its uppermost position 67 the projection 55 on cam 44 engages the outwardly extending projection 53 and moves it under the clutch operating lever 42 where it is frictionally held until it is moved out of engagement by the opposite projection 54 on cam 44. In placing a new reel on the spindle 17 the operator first swings the lever 45 so that the disc 46 is in engagement with the side of the casing, as indicated at 68, that is, in an inoperative position, as heretofore set forth. The member 53 prevents the clutch from being thrown into operation during this swinging movement, but is immediately swung upwardly and out of engagement with the clutch operating lever 42 before the lever 45 and rotary disc 46 reach their inoperative position. After the new reel is in place and the end thereof connected with the end of the old film, which will lie in the bottom of the chamber 15, levers 45 and 64 are thrown into their operative positions again and as soon as the surplus of film in chamber 16 has passed into the projector the new film will be drawn therethrough in the manner set forth.

In the foregoing embodiment of the invention the chambers 15 and 16 have been disclosed in their preferred form side by side. However, their relative position with respect to each other is immaterial, the essential feature being the provision of a space for an accumulation of a surplus film strip to provide for changing the reels. It is likewise to be noted that the preferred embodiment of driving means for accumulating such a surplus of film has been disclosed, which driving means in conjunction with the other parts as shown has proven highly satisfactory in practice.

It will also be noted that the lever 45 is adjustably mounted on the shaft 43 by means of a set screw 45' for changing its length. This provides means whereby the position of the disc 46 may be changed so that the clutch mechanism may be thrown into operation when the amount of film on the reel has been reduced to a predetermined amount which amount may be adjusted so as to provide for a greater or less amount of surplus film in the chamber 16 as may be desired by the operator of the projector.

Many advantages of the feeding magazine herein disclosed will be obvious to those skilled in the art, and obviously the mechanisms are susceptible to various modifications and the proportion and relation of the parts with respect to each other may be changed. Therefore it is not desired to limit the invention to the details illustrated and described.

What is claimed as the invention and is desired to be secured by Letters Patent is:

1. In film feeding mechanism, means for rotatably supporting a reel from which film is to be fed to the motion head of a projecting apparatus, a rotary shaft, a film sprocket rotatable upon the shaft and over which the film is normally drawn by the feed of the motion head of the said apparatus, means operable to clutch the film sprocket with the shaft, and means operatively connected with an element of the clutching means and normally coacting with the film roll and operating automatically when all but a predetermined portion of the film roll has been unwound from the reel, for actuating the clutching means to clutch the sprocket for rotation with the shaft to effect rapid unwinding of the said portion of the film roll.

2. In film feeding mechanism, means for rotatably supporting a reel from which film is to be fed to the motion head of a projecting apparatus, a rotary shaft, a film sprocket rotatable upon the shaft and over which the film is normally drawn by the feed of the motion head of the said apparatus, means operable to clutch the film sprocket with the shaft, and means operatively connected with an element of the clutching means and normally coacting with the film roll and operating automatically when all but a predetermined portion of the film roll has been unwound from the reel, for actuating the clutching means to clutch the sprocket for rotation with the shaft to effect rapid unwinding of the said portion of the film roll and, when the film has been completely unwound, to automatically unclutch the sprocket from the shaft.

3. In film feeding mechanism, means for rotatably supporting a reel from which film is to be fed to the motion head of a projecting apparatus, a rotary shaft, a film sprocket rotatable upon the shaft and over which the film is normally drawn by the feed of the motion head of the said apparatus, a clutch for clutching the film sprocket with the shaft, and means operatively connected with the clutch and coacting with the film roll and normally sustained thereby in position to hold the clutch inactive and arranged to render the clutch active, when all but a predetermined portion of the film roll has been unwound from the reel and the means is no longer sustained by the film roll, whereby to clutch the sprocket for rotation with the shaft to effect rapid unwinding of the said portion of the film roll from the reel.

4. In film feeding mechanism, means for rotatably supporting a reel from which film is to be fed to the motion head of a projecting apparatus, a rotary shaft, a film sprocket rotatable upon the shaft and over which the film is normally drawn by the feed of the motion head of the said apparatus, a clutch for clutching the film sprocket with the shaft for rotation therewith, and means for controlling the said clutch comprising an actuating arm for the clutch having an element resting in contact with the roll of film upon the reel, and means yieldably urging the said arm toward the reel, the arm being normally sustained, by the engagement of its said element with the film roll, in position to hold the clutch inactive, and, in its swinging movement, at the time the said element disengages from the film roll, and when all but a predetermined portion of the film roll has been unwound from the reel, being actuated, through the medium of the urging means, to actuate the clutch to clutch the film sprocket with the shaft whereby to effect rapid unwinding of the remaining portion of the film roll.

5. In film feeding mechanism, means for rotatably supporting a reel from which film is to be fed to the motion head of a projecting apparatus, a rotary shaft, a film sprocket rotatable upon the shaft and over which the film is normally drawn by the feed of the motion head of the said apparatus, a clutch for clutching the film sprocket with the shaft for rotation therewith, means for controlling the said clutch comprising an actuating arm for the clutch having an element resting in contact with the roll of film upon the reel, means yieldably urging the said arm toward the reel, the arm in its swinging movement at the time the said element disengages from the film roll when all but a predetermined portion of the film roll has been unwound from the reel, acting to actuate the clutch to clutch the film sprocket with the shaft whereby to effect rapid unwinding of the remaining portion of the film roll, and means normally restrained from actuation by the film and rendered active upon passage of the end of the film past the same, the said means having operative connection with the clutch to effect actuation thereof to unclutch the sprocket from the shaft.

6. In film feeding mechanism, means for rotatably supporting a reel from which film is to be fed to the motion head of a projecting apparatus, a rotary shaft, a film sprocket rotatable upon the shaft and over which the film is normally drawn by the feed of the motion head of the said apparatus, a clutch for clutching the sprocket for rotation with the shaft, a rotatable cam coacting with a member of the clutch for effecting engagement and disengagement thereof, an arm fixed with relation to the cam for swinging movement, an anti-friction element carried by the arm for contact with a roll of film upon the film reel, means tending to swing the arm toward the said roll, the arm being restrained from such movement through the contact of its anti-friction element with the roll until all but a predetermined portion of the roll has been unwound from the reel whereby to permit operation of the arm through the medium of the said holding means to effect rotation of the cam and actuation of the clutch to clutch the film sprocket with the shaft and effect rapid unwinding of the film from the reel.

7. In film feeding mechanism, means for rotatably supporting a reel from which film is to be fed to the motion head of a projecting apparatus, a rotary shaft, a film sprocket rotatable upon the shaft and over which the film is normally drawn by the feed of the motion head of the said apparatus, a clutch for clutching the sprocket for rotation with the shaft, a rotatable cam coacting with a member of the clutch for effecting engagement and disengagement thereof, an arm fixed with relation to the cam for swinging movement, an anti-friction element carried by the arm for contact with a roll of film upon the film reel, means tending to swing the arm toward the said roll, the arm being restrained from such movement through the contact of its antifriction element with the roll until all but a predetermined portion of the roll has been unwound from the reel whereby to permit operation of the arm through the medium of the said holding means to effect rotation of the cam and actuation of the clutch to clutch the film sprocket with the shaft and effect rapid unwinding of the film from the reel, and means for limiting the movement of the arm after its actuation to actuate the clutch, the said means being maintained in active position by the stretch of film passing from the reel and rendered inactive when the end of the film has passed from the reel, and thereby permit of further movement of said arm to effect rotation of the cam to render the clutch inactive.

8. In film feeding mechanism, means for rotatably supporting a reel from which film is to be fed to the motion head of a projecting apparatus, a rotary shaft, a film sprocket rotatable upon the shaft and over which the film is normally drawn by the feed of the motion head of the said apparatus, a clutch member rotatable with the shaft and shiftable into and out of coactive engagement with the sprocket, a rotatable cam, means actuated through rotative adjustment of the cam for shifting the clutch member, a trip member connected with the cam, a spring coacting with said member and urging the same in a direction to rotate the cam to position to render the clutch active, an arm operatively connected with the cam for movement therewith, an element carried by the arm for contact with the roll of film upon the reel to restrain the arm from movement under the influence of the spring and thus maintain the cam in inactive position, the distance between the axis of movement of the arm and the support for the reel being greater than the distance between said axis and the film contacting element whereby to provide for disengagement of the film contacting element from the film roll when the diameter of the film roll has been predeterminately reduced, through unwinding of the film, and whereby the movement of the arm, when released, will effect movement of the cam to render the clutch active to clutch the film sprocket with its shaft.

9. In film feeding mechanism, means for rotatably supporting a reel from which film is to be fed to the motion head of a projecting apparatus, a rotary shaft, a film sprocket rotatable upon the shaft and over which the film is normally drawn by the feed of the motion head of the said apparatus, a clutch member rotatable with the shaft and shiftable into and out of coactive engagement with the sprocket, a rotatable cam, means actuated through rotative adjustment of the cam for shifting the clutch member, a trip member connected with the cam, a spring coacting with said member and urging the same in a direction to rotate the cam to position to render the clutch active, an arm operatively connected with the cam for movement therewith, an element carried by the arm for contact with the roll of film upon the reel to restrain the arm from movement under the influence of the spring and thus maintain the cam in inactive position, the distance between the axis of movement of the arm and the support for the reel being greater than the distance between said axis and the film contacting element whereby to provide for disengagement of the film contacting element from the film roll when the diameter of the film roll has been predeterminately reduced, through unwinding of the film, and whereby movement of the arm, when released, will effect movement of the cam to render the clutch active to clutch the film sprocket with its shaft, and means normally restrained through contact with a stretch of the film and coacting with the trip member to in turn restrain the same from actuation whereby when the last mentioned means is relieved of restraint at the time the end of the film has left the reel and passed said means, the trip member will be tripped to effect rotative adjustment of the cam to render the clutch inactive.

10. In film feeding mechanism, means for rotatably supporting a reel from which film is to be fed to the motion head of a projecting apparatus, a rotary shaft, a film sprocket rotatable upon the shaft and over which the film is normally drawn by the feed of the motion head of the said apparatus, a clutch member rotatable with the shaft and shiftable into and out of coactive engagement with the sprocket, a rotatable cam, means actuated through rotative adjustment of the cam for shifting the clutch member, a trip member connected with the cam, a spring coacting with said member and urging the same in a direction to rotate the cam to position to render the clutch active, an arm operatively connected with the cam for movement therewith, an element carried by the arm for contact with the roll of film upon the reel to restrain the arm from movement under the influence of the spring and thus maintain the cam in inactive position, the distance between the axis of movement of the arm and the support for the reel being greater than the distance between said axis of the film contacting element whereby to provide for disengagement of the film contacting element from the film roll when the diameter of the film roll has been predeterminately reduced, through unwinding of the film, and whereby movement of the arm, when released, will effect movement of the cam to render the clutch active to clutch the film sprocket with its shaft, and means normally restrained through contact with a stretch of the film and coacting with the trip member to in turn restrain the same from actuation whereby when the last mentioned means is relieved of restraint at the time the end of the film has left the reel and passed said means, the trip member will be tripped to effect rotative adjustment of the cam to render the clutch inactive, the last mentioned means comprising a rocking arm, a film contacting wheel carried thereby, an idle film pulley about which the said stretch of the film is passed, the said pulley having a peripheral groove and the said wheel being positioned to contact the film opposite the groove whereby to be normally restrained by the film and, after the film end has passed over the pulley, permitting the wheel to pass through the groove and thus permit operative movement of the arm, and a detent finger associated with the said arm and movable therewith, and means upon the trip member engaging the said detent finger and restraining the trip member from movement to active position under the influence of the said spring when the said film engaging wheel is in engagement with the film.

11. In the film feeding mechanism, a casing, a partition wall within the casing dividing the same to provide a compartment housing the mechanism and a film receiving compartment, means within the first mentioned compartment for supporting a reel from which film is to be fed to the motion head of a projecting apparatus, a film guide pulley, in the first mentioned compartment about which the film is to be led from the reel, a film guide pulley and a film sprocket in the second mentioned compartment about which the film is to be led from the first mentioned pulley, whereby the film may be led from the second mentioned compartment through a wall of the casing to the feed of the motion head of the projecting apparatus and drawn thereby from the mechanism, a shaft supporting the film sprocket for rotation, means for imparting continuous rotary motion to the shaft, and means operating automatically when all but a predetermined portion of the film roll has been unwound from the reel, for clutching the sprocket for rotation with the shaft to effect rapid unwinding of the said portion of the film roll and disposition of the unwound film in the said film receiving compartment.

12. In film feeding mechanism, a casing, a partition wall within the casing dividing the same to provide a compartment for housing the mechanism and a film receiving compartment, means within the first mentioned compartment for supporting a reel from which film is to be fed to the motion head of a projecting apparatus, a film guide pulley in the first mentioned compartment about which the film is to be led from the reel, a film guide pulley and a film sprocket in the second mentioned compartment about which the film is to be fed from the first mentioned pulley, whereby the film may be led from the second mentioned compartment through a wall of the casing to the feed of the motion head of the projecting apparatus and drawn thereby from the mechanism, a shaft supporting the film sprocket for rotation, means for imparting continuous rotary motion to the shaft, and means operating automatically when all but a predetermined portion of the film roll has been unwound from the reel, for clutching the sprocket for rotation with the shaft to effect rapid unwinding of the said portion of the film roll and disposition of the unwound film in the said film receiving compartment, and, when the film has been completely unwound from the reel, for automatically unclutching the sprocket from the shaft whereby to discontinue the feeding of the film by the sprocket and whereby to deposit the trailing end of the film into the first mentioned compartment where it may be spliced to the end of a film upon a replacement reel substituted for the empty reel.

13. In film feeding mechanism, a casing, a partition wall within the casing dividing the same to provide a compartment for housing the mechanism and a film receiving compartment, means within the first mentioned compartment for supporting a reel from which film is to be fed to the motion head of a projecting apparatus, a film guide pulley in the first mentioned compartment about which the film is to be led from the reel, a film guide pulley and a film sprocket in the second mentioned compartment about which the film is to be led from the first mentioned pulley, whereby the film may be led from the second mentioned compartment through a wall of the casing to the feed of the motion head of the projecting apparatus and drawn thereby from the mechanism, a shaft supporting the film sprocket for rotation, means for imparting continuous rotary motion to the shaft, means operating automatically when all but a predetermined portion of the film roll has been unwound from the reel for clutching the sprocket for rotation with the shaft to effect rapid unwinding of the said portion of the film roll and the disposition thereof in the said film receiving compartment, a presser roll coacting with the said film sprocket, means yieldably holding the presser roll in coactive relation to the said sprocket, and a guard within the second mentioned compartment extending from a wall thereof to a point adjacent the said presser roll whereby to insure of delivery of the said portion of the film into the said film receiving compartment.

14. In a film feeding mechanism, a casing, a partition dividing the casing into two compartments, the said compartments being substantially co-terminous compartments in substantially parallel planes, means for rotatably supporting a reel in one of said compartments from which the film is to be fed to the motion head of a projecting apparatus, a rotary shaft disposed in the other said compartment, a film sprocket rotatable upon said shaft and over which the film is normally drawn by the feed of said motion head, means including a guide roller partly disposed in both of said compartments for guiding the film from the first said compartment to the second said compartment, means operable to clutch the film sprocket with the shaft, and means operatively connected with an element of the clutching means and normally co-acting with the film roll and operating automatically when all but a pre-determined portion of the film roll has been unwound from the reel for actuating the clutching means to clutch the sprocket for rotation with the shaft to effect rapid unwinding of the said portion of the film roll.

15. A film feeding mechanism in accordance with claim 12 wherein the compartment for housing the mechanism and the film receiving compartment are substantially coterminous in substantially parallel planes.

In testimony whereof I affix my signature.

CHARLES W. HATKE.